(12) United States Patent
Deng et al.

(10) Patent No.: US 10,807,178 B2
(45) Date of Patent: *Oct. 20, 2020

(54) FIXING APPARATUS

(71) Applicants: Tyco Electronics (Shanghai) Co. Ltd., Shanghai (CN); Measurement Specialties (Chengdu) Ltd., Chendu (CN); TE Connectivity Corporation, Berwyn, PA (US)

(72) Inventors: Yingcong Deng, Shanghai (CN); Lan Gong, Shanghai (CN); Qian Ying, Shanghai (CN); Dandan Zhang, Shanghai (CN); Lvhai Hu, Shanghai (CN); Yun Liu, Shanghai (CN); Lin Ye, Shanghai (CN); Yong Yan, Shanghai (CN); Roberto Francisco-Yi Lu, Shanghai (CN); Qinglong Zeng, Shanghai (CN)

(73) Assignees: Tyco Electronics (Shanghai) Co. Ltd., Shanghai (CN); TE Connectivity Corporation, Berwyn, PA (US); Measurement Specialties (Chengdu) Ltd., Chengdu (CN)

( * ) Notice: Subject to any disclaimer, the term of this patent is extended or adjusted under 35 U.S.C. 154(b) by 322 days.

This patent is subject to a terminal disclaimer.

(21) Appl. No.: 15/868,291

(22) Filed: Jan. 11, 2018

(65) Prior Publication Data

US 2018/0200821 A1 Jul. 19, 2018

(30) Foreign Application Priority Data

Jan. 13, 2017 (CN) .......................... 2017 1 0024186

(51) Int. Cl.
*B23K 3/08* (2006.01)
*H01R 43/02* (2006.01)
*H01R 4/02* (2006.01)

(52) U.S. Cl.
CPC ........... *B23K 3/08* (2013.01); *H01R 43/0263* (2013.01); *H01R 4/023* (2013.01); *H01R 4/027* (2013.01)

(58) Field of Classification Search
CPC ....... B23K 3/087; B23P 11/00; H05K 3/3405; H01R 43/0263; H01R 4/023; H01R 4/027
See application file for complete search history.

(56) References Cited

U.S. PATENT DOCUMENTS

| 6,769,931 B2 * | 8/2004 | Negishi | ............... | H01R 4/2433 439/402 |
| 8,196,734 B2 * | 6/2012 | Chen | .................. | B23K 1/0016 198/429 |

(Continued)

*Primary Examiner* — Tyrone V Hall, Jr.
*Assistant Examiner* — Makena S Markman
(74) *Attorney, Agent, or Firm* — Barley Snyder (57) ABSTRACT

A fixing apparatus comprises a first fixing device and a second fixing device. The first fixing device has at least one first positioning groove adapted to position at least one first elongated member and fixes the at least one first elongated member. The second fixing device has at least one second positioning groove adapted to position at least one second elongated member and fixes the at least one second elongated member. Each first positioning groove is aligned with a corresponding second positioning groove so that the first elongated member fixed in the first positioning groove is axially aligned with the second elongated member fixed in the corresponding second positioning groove.

19 Claims, 6 Drawing Sheets

(56) References Cited

U.S. PATENT DOCUMENTS

| | | | | |
|---|---|---|---|---|
| 8,512,066 B2* | 8/2013 | Lee | ............... | H01R 4/2433 |
| | | | | 439/395 |
| 2001/0034145 A1* | 10/2001 | Uratani | ............ | H01R 4/028 |
| | | | | 439/83 |
| 2010/0068917 A1* | 3/2010 | Dennes | ............ | H01R 4/2433 |
| | | | | 439/409 |
| 2013/0186941 A1* | 7/2013 | Nikkhoo | ............ | B23K 3/00 |
| | | | | 228/176 |

\* cited by examiner

FIXING APPARATUS

CROSS-REFERENCE TO RELATED APPLICATION

This application claims the benefit of the filing date under 35 U.S.C. § 119(a)-(d) of Chinese Patent Application No. 201710024186.8, filed on Jan. 13, 2017.

FIELD OF THE INVENTION

The present invention relates to a fixing apparatus and, more particularly, to a fixing apparatus adapted to fix an elongated member.

BACKGROUND

In electronics manufacturing, it is often necessary to solder an elongated member, such as an elongated wire, to a needle-shaped pin of an electronic device. In order to ensure soldering accuracy, the wire and the pin of the electronic device need to be accurately positioned and fixed at a predetermined position so that the axes of the wire and the pin are accurately aligned with each other.

No fixing apparatus in the prior art is adapted to accurately position and fix such an elongated member. In the prior art, the elongated member is usually manually positioned and fixed, reducing the soldering accuracy and corresponding quality of a soldered product.

SUMMARY

A fixing apparatus comprises a first fixing device and a second fixing device. The first fixing device has at least one first positioning groove adapted to position at least one first elongated member and fixes the at least one first elongated member. The second fixing device has at least one second positioning groove adapted to position at least one second elongated member and fixes the at least one second elongated member. Each first positioning groove is aligned with a corresponding second positioning groove so that the first elongated member fixed in the first positioning groove is axially aligned with the second elongated member fixed in the corresponding second positioning groove.

BRIEF DESCRIPTION OF THE DRAWINGS

The invention will now be described by way of example with reference to the accompanying Figures, of which.

DETAILED DESCRIPTION OF THE EMBODIMENT(S)

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 1:
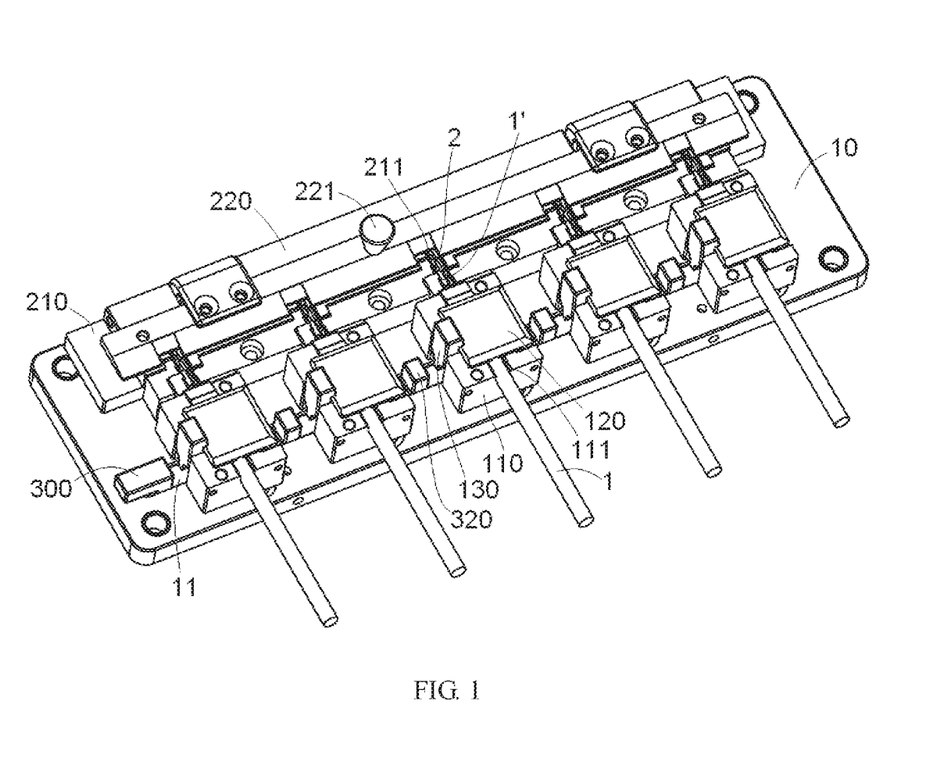
FIG. 1 is a perspective view of a fixing apparatus according to the invention.
Figure 2:
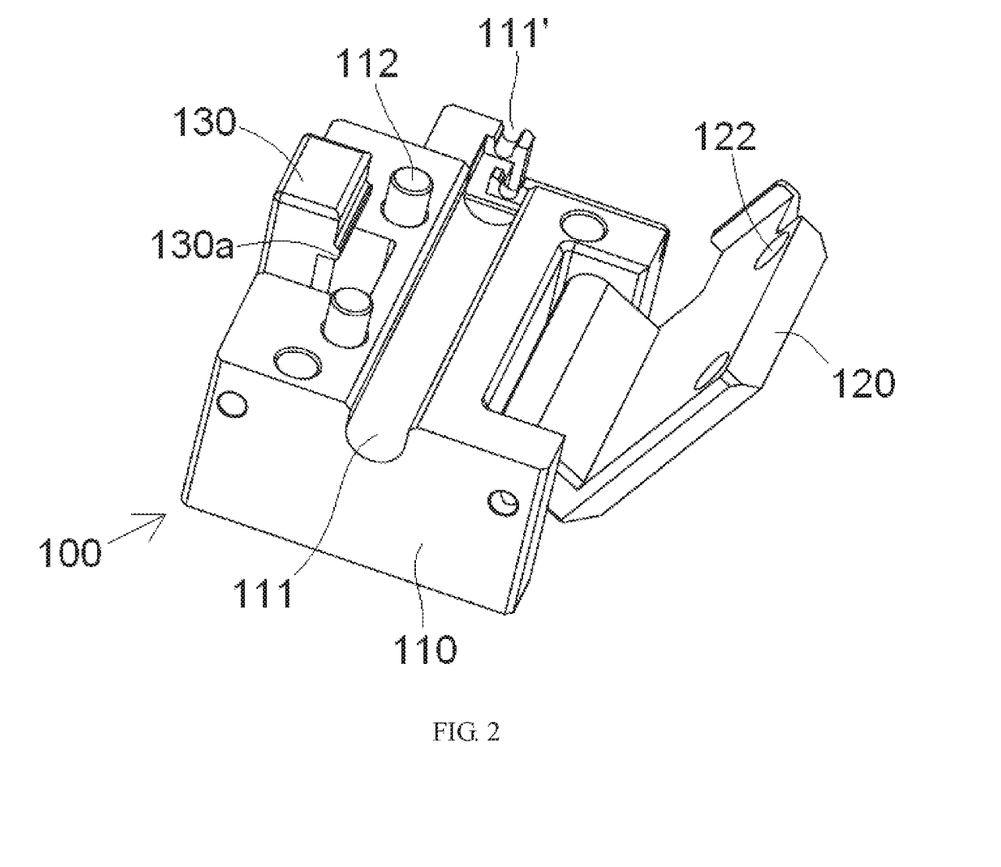
FIG. 2 is a perspective view of a first fixing device of the fixing apparatus with a first pressing cover of the first fixing device in an open state.
Figure 7:
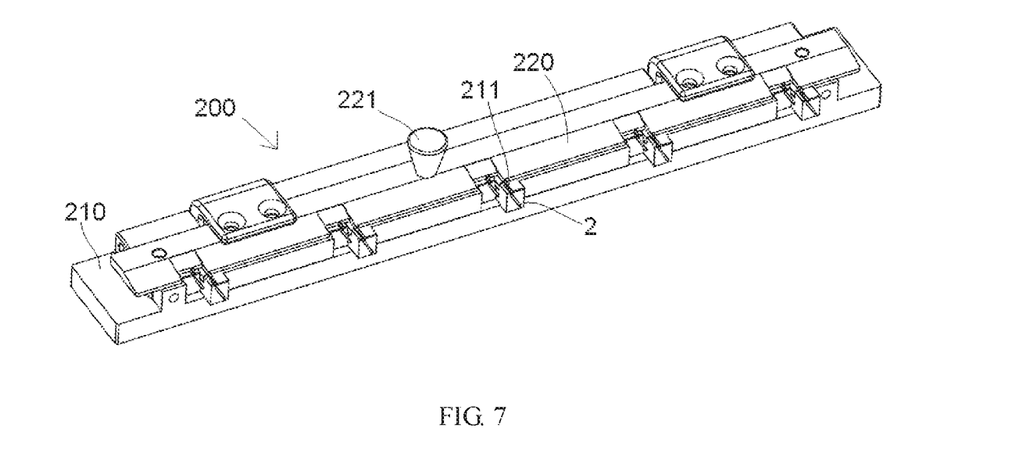
FIG. 7 is a perspective view of a second fixing device of the fixing apparatus with a second pressing cover of the second fixing device in a closed state.

A fixing apparatus according to the invention, as shown in FIGS. 1, 2, and 7, includes a first fixing device 100 and a second fixing device 200. The first fixing device 100 is adapted to simultaneously position and fix at least one first elongated member 1. The second fixing device 200 is adapted to simultaneously position and fix at least one second elongated member 2. In the shown embodiment, the fixing apparatus has a plurality of first fixing devices 100 arranged in a row and simultaneously positioning and fixing five first elongated members 1. The second fixing device 200 simultaneously positions and fixes five second elongated members 2 in the shown embodiment. In other embodiments, the number of first elongated members 1 and second elongated members 2 may vary.

Figure 8:
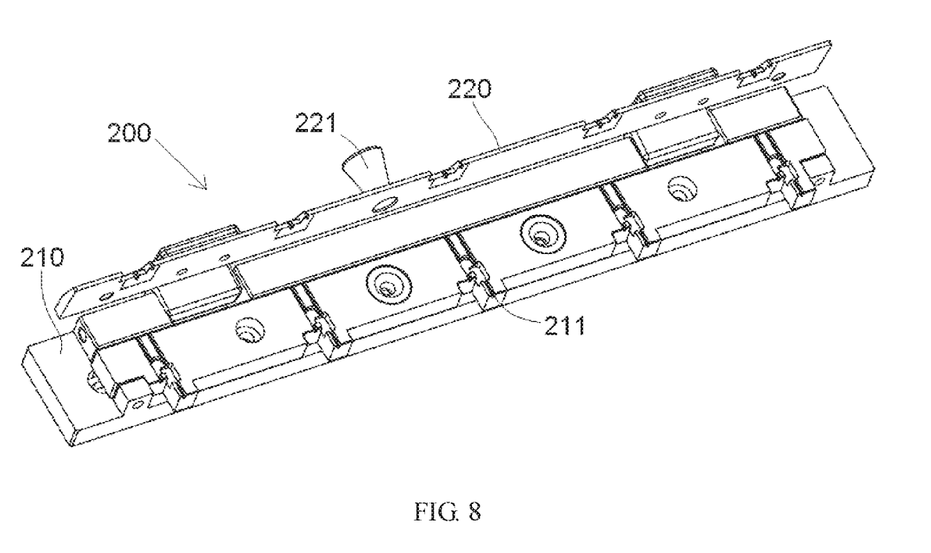
FIG. 8 is a perspective view of the second fixing device with the second pressing cover in an open state.

The first fixing device 100, as shown in FIG. 2, has at least one first positioning groove 111 adapted to position the first elongated member 1. The second fixing device 200, as shown in FIG. 8, has at least one second positioning groove 211 adapted to position the second elongated member 2. The number of second positioning grooves 211 in the second fixing device 200 corresponds to the number of simultaneously positioned and fixed second elongated members 2. As shown in FIG. 1, the first positioning groove 111 is aligned with one corresponding second positioning groove 211 so that the first elongated member 1 fixed in the first positioning groove 111 is axially aligned with the second elongated member 2 positioned in the corresponding second positioning groove 211. The first elongated members 1 and the second elongated member 2 may then be electrically connected with each other, for example, soldered together.

In an embodiment, the first elongated member 1 is a wire and the first positioning groove 111 has a conductor position groove 111' as shown in FIGS. 1 and 2 adapted to position a conductor 1' of the wire. In embodiment, the second elongated member 2 is a needle-shaped pin of an electronic device adapted to be soldered with the conductor 1' of the wire 1.

Figure 3:
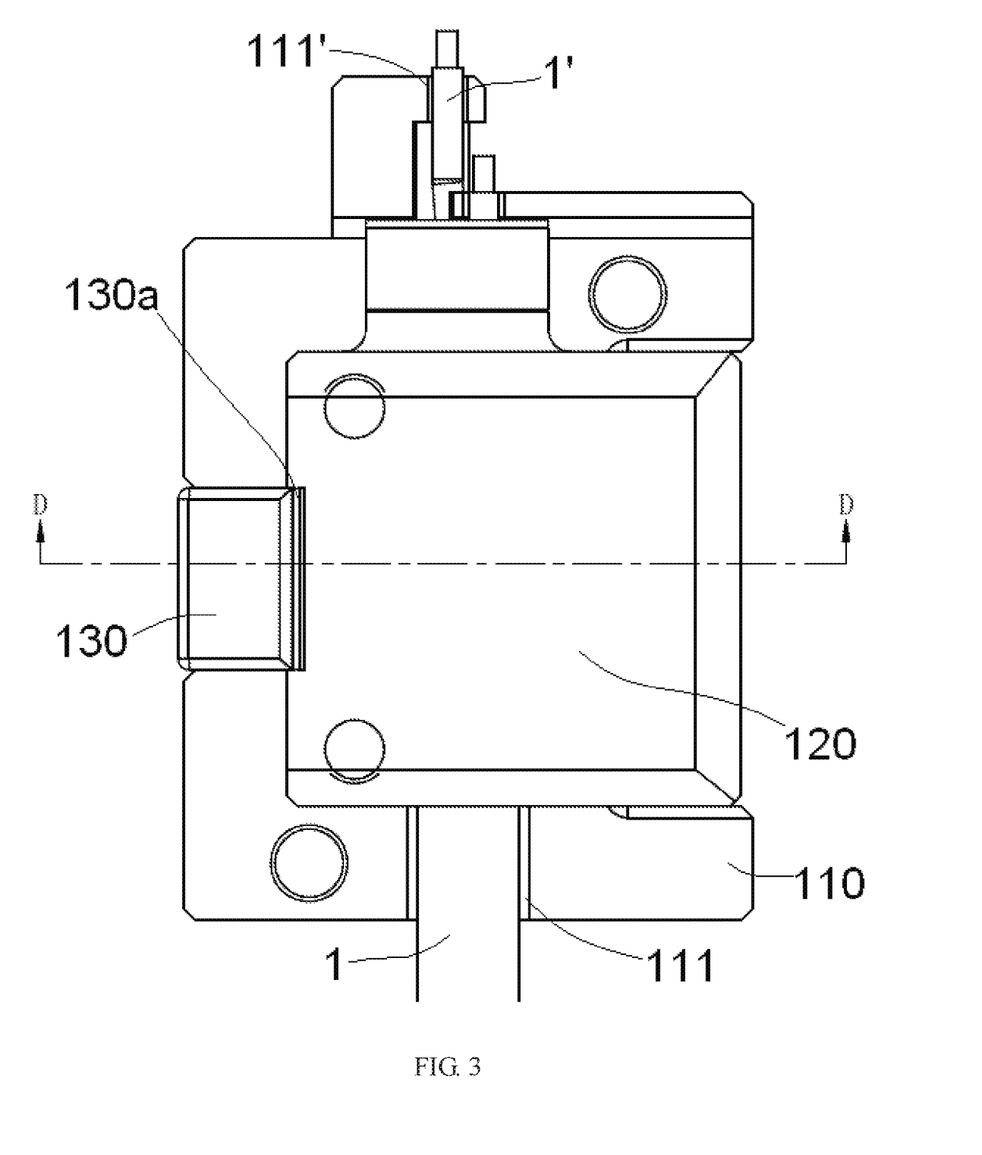
FIG. 3 is a plan view of the first fixing device with the first pressing cover in a closed state.
Figure 4:
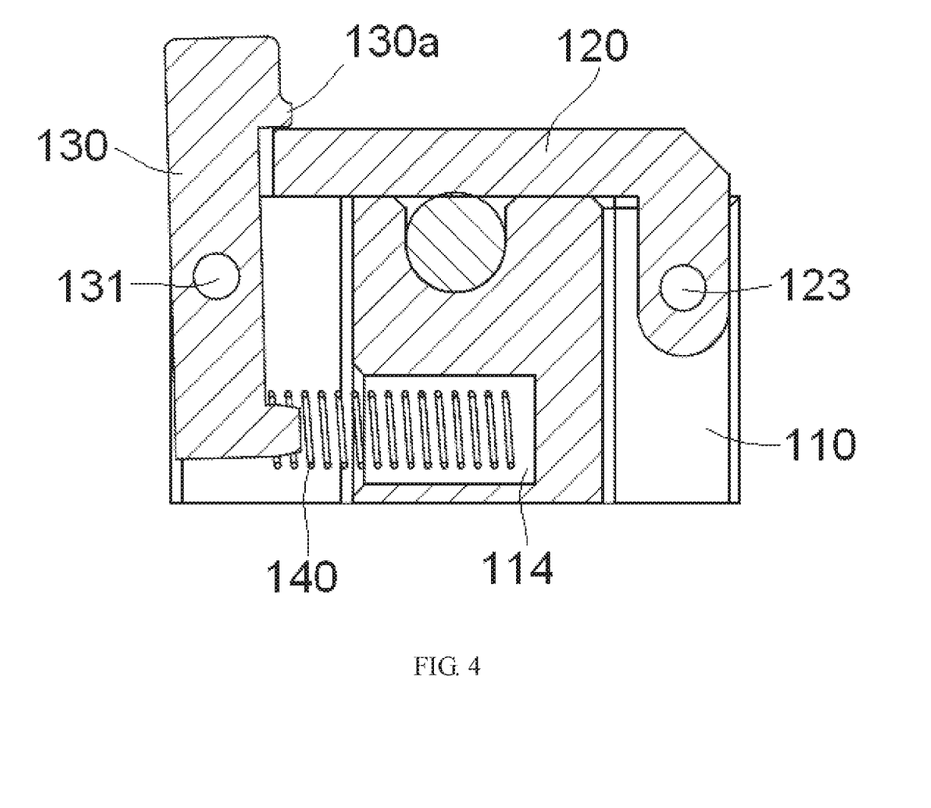
FIG. 4 is a sectional view of the first fixing device taken along line D-D of FIG. 3 with the first pressing cover in the closed state and a lock of the first fixing device in a locked position.

The first fixing device 100, as shown in FIGS. 2-4, has a first fixing base 110, a first pressing cover 120, and a lock 130. The first positioning groove 111 is formed in the first fixing base 110. The first pressing cover 120 is pivotally connected to a first side of the first fixing base 110 by a first pivot shaft 123 and is rotatable between an open state and a closed state. The lock 130 is pivotally connected to a second side of the first fixing base 110 opposite the first side by a second pivot shaft 131 and is rotatable between a locked position and an unlocked position. The lock 130 has a connection portion between an upper end of the lock 130 and a lower end of the lock 130 pivotally connected to the first fixing base 110 by the second pivot shaft 131.

As shown in FIGS. 2-4, the first pressing cover 120 is adapted to hold the first elongated member 1 in the first positioning groove 111 when in the closed state. The lock 130 is adapted to lock the first pressing cover 120 in the closed state when in the locked position. The lock 130 has a locking lip 130a protruding onto a top of the first pressing cover 120 from an upper end of the lock 130. The locking lip 130a engages an edge portion of the first pressing cover 120, so that the first pressing cover 120 is held in the closed state.

Figure 6:
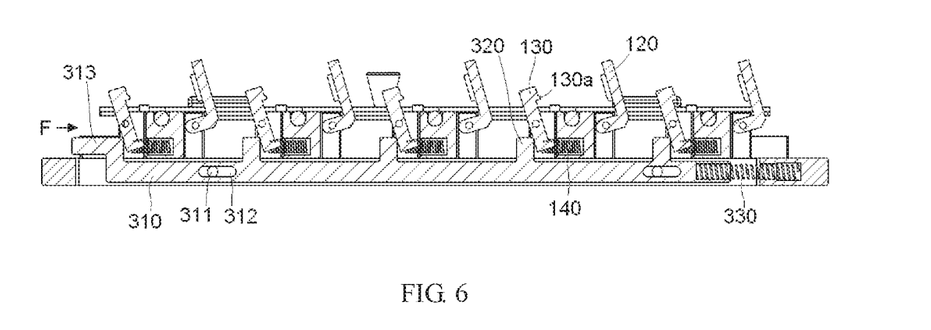
FIG. 6 is a sectional view of the fixing apparatus with the first pressing cover in the open state, the lock in an unlocked position, and the unlocking device in a driven state.

The first fixing base 110, as shown in FIG. 4, has a spring receiving chamber 114 in which a first spring 140 is received. An end of the first spring 140 is pressed against the lower end of the lock 130 to hold the lock 130 in the locked position. As shown in FIGS. 4 and 6, when the lock 130 receives a driving force F counter to the first spring 140 at the lower end of the lock 130, the lock 130 may overcome a first spring force of the first spring 140 to be rotated from the locked position to the unlocked position, disengaging the lock 130 from the first pressing cover 120. The first spring force of the first spring 140 holds or biases the lock 130 into the locked position.

Figure 5:
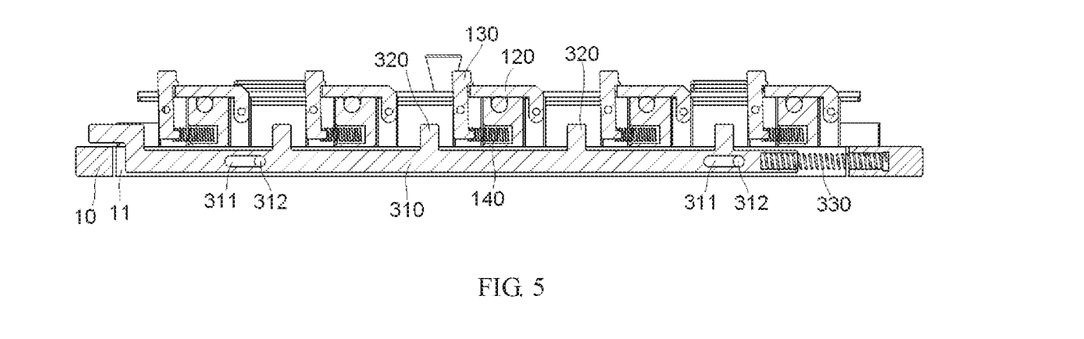
FIG. 5 is a sectional view of the fixing apparatus with the first pressing cover in the closed state, the lock in the locked position, and an unlocking device in an initial position.

The fixing apparatus, as shown in FIGS. 1, 5, and 6, further comprises a mounting base 10 and an unlocking device 300. The first fixing device 100 and the second fixing device 200 are fixedly mounted on the mounting base 10. The unlocking device 300 is slidably mounted on the mounting base 10.

The unlocking device 300, as shown in FIGS. 5 and 6, has a pressing protrusion 320 adapted to push the lower end of the lock 130 to drive the lock 130 to be rotated from the locked position to the unlocked position. The unlocking device 300 comprises a strip-shaped body 310 on which the pressing protrusion 320 is formed. The mounting base 10 is formed with a receiving groove 11 into which the strip-shaped body 310 of the unlocking device 300 is received. One of the strip-shaped body 310 and the mounting base 10 is formed with a sliding slot 312 and the other is provided with a support column 311 received in the sliding slot 312 so that the strip-shaped body 310 is slidable back and forth along the sliding slot 312 relative to the mounting base 10. In the shown embodiment, the sliding slot 312 is formed in the strip-shaped body 310 and the support column 311 is formed on the mounting base 10 and inserted in the sliding slot 312.

The unlocking device 300 further comprises a pushing portion 313 formed on a first end of the strip-shaped body 310 as shown in FIGS. 5 and 6. When the pushing portion 313 receives the driving force F counter to the first spring force of the first spring 140, as shown in FIG. 6, the pushing protrusion 320 of the unlocking device 300 is moved toward the corresponding lock 130 to drive the lock 130 to be rotated from the locked position to the unlocked position.

The strip-shaped body 310, as shown in FIGS. 5 and 6, has a second spring 330 at a second end opposite the first end of the strip-shaped body 310. A first end of the second spring 330 abuts against and imparts a second spring force against the second end of the strip-shaped body 310. When the driving force F exerted on the pushing portion 313 is released, as shown in FIG. 5, the pressing protrusion 320 of the unlocking device 300 is driven by the second spring 330 to move away from the corresponding lock 130, so that the pressing protrusion 320 of the unlocking device 300 is automatically reset to an initial position separated from the corresponding lock 130. The locking device 130 is then driven by the first spring 140 to be rotated from the unlocked position to the locked position.

The second fixing device 200, as shown in FIGS. 7 and 8, comprises a second fixing base 210 and a second pressing cover 220. The second positioning groove 211 is formed in the second fixing base 210. The second pressing cover 220 is pivotally connected to the second fixing base 210 and adapted to be rotated between an open state shown in FIG. 8 and a closed state shown in FIG. 7. The second pressing cover 220 is adapted to press the second elongated member 2 in the second positioning groove 211 when in the closed state, as shown in FIG. 1. The second pressing cover 220 has a handle portion 221 on a top surface of the second pressing cover 220, as shown in FIGS. 1, 7, and 8, by which the second pressing cover 220 may be opened and closed.

What is claimed is:

1. A fixing apparatus, comprising:
   a first fixing device having at least one first positioning groove adapted to position at least one first elongated member and fixing the at least one first elongated member, and comprising:
   a first fixing base in which the first positioning groove is formed;
   a first pressing cover pivotally connected to a first side of the first fixing base and rotatable between an open state and a closed state;
   a lock pivotally connected to a second side of the first fixing base opposite the first side and rotatable between a locked position and an unlocked position; and
   a first spring abutting against a lower end of the lock and providing a first spring force against the lower end of the lock to hold the lock in the locked position; and
   a second fixing device having at least one second positioning groove adapted to position at least one second elongated member and fixing the at least one second elongated member, each first positioning groove is aligned with a corresponding second positioning groove so that the first elongated member fixed in the first positioning groove is axially aligned with the second elongated member fixed in the corresponding second positioning groove.

2. The fixing apparatus of claim 1, wherein the first pressing cover holds the first elongated member in the first positioning groove in the closed state and the lock locks the first pressing cover in the closed state when in the locked position.

3. The fixing apparatus of claim 2, wherein the lock has a locking lip at an upper end of the lock, the locking lip engaging an edge portion of the first pressing cover.

4. The fixing apparatus of claim 2, wherein the lock has a connection portion pivotally connected to the first fixing base.

5. The fixing apparatus of claim 4, wherein the first fixing base has a spring receiving chamber in which the first spring is disposed.

6. The fixing apparatus of claim 5, wherein the lock overcomes the first spring force to rotate from the locked position to the unlocked position and disengage from the first pressing cover when the lock receives a driving force counter to the first spring force at the lower end of the lock.

7. The fixing apparatus of claim 6, further comprising a mounting base on which the first fixing device and the second fixing device are fixedly mounted.

8. The fixing apparatus of claim 7, further comprising an unlocking device slidably mounted on the mounting base, the unlocking device having at least one pressing protrusion adapted to push the lower end of the lock to rotate the lock from the locked position to the unlocked position.

9. The fixing apparatus of claim 8, wherein the unlocking device has a strip-shaped body on which the pressing protrusion is formed and the mounting base has a receiving groove in which the strip-shaped body is slidably received.

10. The fixing apparatus of claim 9, wherein one of the strip-shaped body and the mounting base has a sliding slot and the other of the strip-shaped body and the mounting base has a support column, the support column received in the sliding slot so that the strip-shaped body is slidable along the sliding slot relative to the mounting base.

11. The fixing apparatus of claim 10, wherein the unlocking device has a pushing portion disposed on a first end of the strip-shaped body, the pushing protrusion moving toward the lock to rotate the lock from the locked position to the unlocked position when the pushing portion receives the driving force.

12. The fixing apparatus of claim 11, wherein the strip-shaped body has a second spring at a second end of the strip-shaped body opposite the first end, an end of the second spring abutting against the second end of the strip-shaped body and imparting a second spring force against the second end of the strip-shaped body.

13. The fixing apparatus of claim 12, wherein the pressing protrusion is driven by the second spring force of the second spring to move away from the lock and automatically reset the pressing protrusion into an initial state separated from the lock when the driving force applied to the pushing portion is released.

14. The fixing apparatus of claim 1, wherein the second fixing device has a second fixing base in which the at least one second positioning groove is formed and a second pressing cover pivotally connected to the second fixing base and rotatable between an open state and a closed state.

15. The fixing apparatus of claim 14, wherein the second pressing cover is adapted to hold the second elongated member in the second positioning groove in the closed state of the second pressing cover.

16. The fixing apparatus of claim 15, wherein the second pressing cover has a handle portion on a top surface of the second pressing cover by which the second pressing cover is moved between the open state and the closed state.

17. A fixing apparatus comprising:
a plurality of first fixing devices arranged in a row and simultaneously positioning and fixing each of a plurality of first elongated elements in a respective first positioning groove of each first fixing device; and
a single second fixing device having a second fixing base in which a row of second positioning grooves are formed, the second fixing device simultaneously positioning and fixing a plurality of second elongated members, wherein each first positioning groove is aligned with a corresponding second positioning groove so that each of the first elongated members fixed in one of the first positioning grooves is axially aligned with a corresponding one of the second elongated members fixed in one of the second positioning grooves;
wherein, each first fixing device has a first fixing base in which the first positioning groove is formed, and a spring-biased lock pivotally connected to a second side of the first fixing base opposite the first side being rotatable between a locked position and an unlocked position.

18. The fixing apparatus of claim 17, wherein each of the plurality of first fixing devices comprises:
a first pressing cover pivotally connected to a first side of the first fixing base and rotatable between an open state and a closed state.

19. The fixing apparatus of claim 18, further comprising:
a mounting base on which the plurality of first fixing devices and the second fixing device are fixedly mounted;
an unlocking device slidably mounted on the mounting base, the unlocking device adapted to selectively bias the lock of each of the plurality of first fixing devices from the locked position to the unlocked position in response to a single application of force on the unlocking device.

* * * * *